E. S. JESSEPH.
CUTTER HEAD.
APPLICATION FILED SEPT. 15, 1915.
1,222,871.
Patented Apr. 17, 1917.
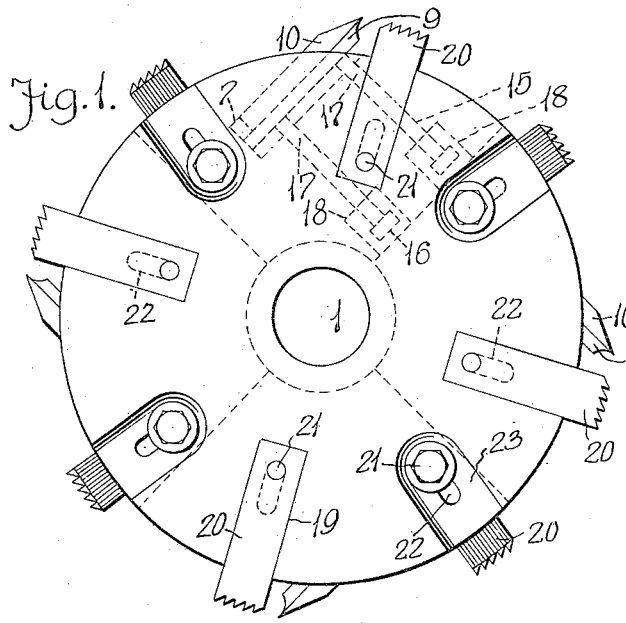
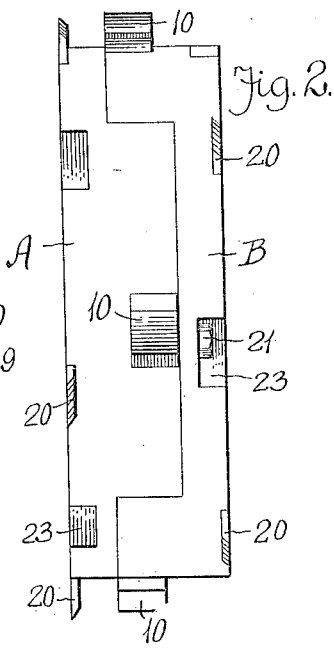
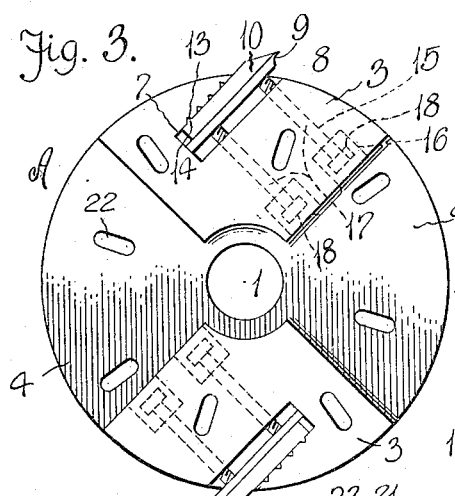
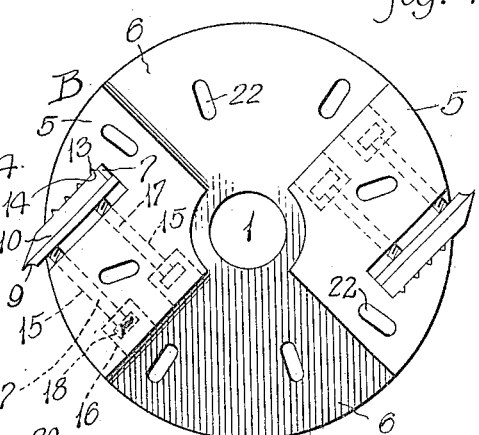
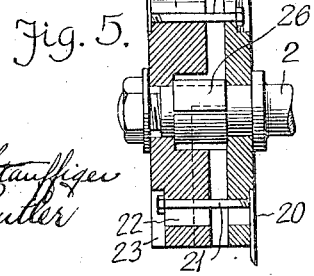
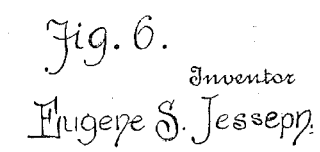
Witnesses
Chas. W. Stauffiger
Karl H. Butler
Inventor
Eugene S. Jesseph.
By Barthoff Barthoff
Attorney

UNITED STATES PATENT OFFICE.

EUGENE S. JESSEPH, OF DETROIT, MICHIGAN.

CUTTER-HEAD.

1,222,871.

Specification of Letters Patent.

Patented Apr. 17, 1917.

Application filed September 15, 1915. Serial No. 50,729.

*To all whom it may concern:*

Be it known that I, EUGENE S. JESSEPH, a citizen of the United States of America, residing at Detroit, in the county of Wayne and State of Michigan, have invented certain new and useful Improvements in Cutter-Heads, of which the following is a specification, reference being had therein to the accompanying drawings.

This invention relates to cutter heads that can be used on any saw mandrel or saw rig for cutting perfect grooves or kerfs, any width, with or across the grain of a piece of wood or material.

My invention aims to provide a cutter head of the above type composed of interlocked members adapted for rotative continuity with a driven shaft or arbor, and each member has a plurality of spur bits, saw knives or similar cutting or trimming instrumentalities whereby grooves of a desired depth, width or cross sectional area can be easily cut. Again, my invention aims to provide a cutter head that can be used as a saw mandrel or shaper for producing beads and various kinds of molding.

My invention further aims to provide a cutter head wherein the cutter parts are constructed with a view of reducing the cost of manufacture and at the same time retaining the features by which accuracy, safety, durability, minimum expenditure of power, simplicity and ease of assembling are secured, and with such ends in view, my invention resides in the novel construction, combination and arrangement of parts to be hereinafter specifically described and then claimed.

Reference will now be had to the drawing, wherein—

Figure 1 is a side elevation of a cutter head in accordance with my invention;

Fig. 2 is a front elevation of the same;

Fig. 3 is an elevation of the inner side of one of the members of the cutter head;

Fig. 4 is a similar view of the other member of the cutter head;

Fig. 5 is a cross sectional view of the cutter head on a smaller scale, illustrating a spacing member, and Fig. 6 is a fragmentary sectional view of the cutter head illustrating a slight modification of my invention.

The cutter head is circular in elevation and is composed of members generally designated A and B, and these members are formed to fit together and interlock, whereby said members are moved in synchronism when mounted upon the shaft or arbor of a saw mandrel or rig. The member A has a concentric opening 1 adapted to accommodate a shaft or arbor 2. The inner face of the member A has opposed sector-shaped enlargements 3 and between said enlargements are recesses 4 to receive complemental enlargements 5 of the inner face of the member B said enlargements providing recesses 6 to receive the complemental enlargements 3 of the member A. It is through the medium of the enlargements 3 and 5 and the recesses 4 and 6 that the two members can be fitted together as shown in Fig. 2, or spaced apart, as shown in Fig. 5 for rotative continuity with the shaft 2.

Each enlargement has the face thereof provided with a tangentially disposed groove 7 to receive a holder 9 and a spur bit 10. The holder 9 engages the bit 10 and retains said bit in engagement with the outer wall of the groove 7, said wall having notches 13 to receive projections 14 on the bit 10, thus preventing accidental longitudinal displacement of the bit in the groove 7.

Each enlargement 3 has parallel openings 15 and recesses 16, the openings having the walls screwthreaded and the grooves being disposed at right angles to the groove 7 to accommodate screw bolts 17 having heads 18 in the recesses 16. The screw bolts 17 engage the holder 9 and it is through the medium of the screw bolts 17 that adjustment can be made for holding the spur bit 10.

The outer faces of the members A and B have radially disposed seats 19 for saw knives 20 and these knives are adjustably held by screw bolts 21 extending through slots 22 in the members A and B, said screw bolts having the heads thereof housed within radially disposed recesses 23 in the outer faces of the members A and B.

As shown in Fig. 1, it is preferable to alternately arrange the seats 19 and the recess 23, with the saw knives in advance of the spur bits. The screw bolts 21 coöperate in retaining the members A and B together, but in some instances, the inner faces of said members can be recessed, as at 24 to receive the heads of short bolts 25 for holding the saw knives. This construction is shown in Fig. 6, and may be resorted to in some instances.

As shown in Fig. 5, a two-part sleeve 26 may be placed upon the shaft 2 between the members A and B to separate said members and obtain a wide groove or kerf. Two-part sleeves of various lengths or suitable liners can be used between the members, but in each instance the radially disposed faces of the enlargements 3 and 6 must contact to insure simultaneous movement of the members A and B when driven by the shaft 2.

It is to be understood that various kinds of bits, knives or other instruments can be used with the cutter to obtain grooves and kerfs of desired cross sectional areas, and while in the drawings there has been illustrated the preferred embodiment of my invention, it is to be further understood that the same are susceptible to such variations and modifications as fall within the scope of the appended claim.

What I claim is:—

A cutter head comprising circular members A and B, opposed sector shaped enlargements on the member A providing similarly shaped recesses, each having the rear wall with the outer edge thereof forming part of the periphery of a member, opposed sector shaped enlargements on the member B adapted to fit in the recesses of the member A and provide recesses similar to the recesses of the member A to receive the enlargements of the member A, cutters set in the faces of the enlargements of both members and engaged by the rear walls of the recesses of said members with the cutters of one member positioned to balance the cutters of the other member, a split sleeve between the members A and B surrounded by the enlargements of said members, and means extending transversely of said members connecting said members and retaining said members against the ends of said split sleeve.

In testimony whereof I affix my signature in presence of two witnesses.

EUGENE S. JESSEPH.

Witnesses:
 LEWIS E. FLANDERS,
 ANNA M. DORR.

Copies of this patent may be obtained for five cents each, by addressing the "Commissioner of Patents, Washington, D. C."